United States Patent
Lewis

(10) Patent No.: US 8,650,535 B2
(45) Date of Patent: *Feb. 11, 2014

(54) METHODS AND TOOLS FOR DATA-DRIVEN APPLICATION ENGINEERING

(75) Inventor: William J. Lewis, Pittsburgh, PA (US)

(73) Assignee: International Business Machines Corporation, Armonk, NY (US)

(*) Notice: Subject to any disclaimer, the term of this patent is extended or adjusted under 35 U.S.C. 154(b) by 67 days.

This patent is subject to a terminal disclaimer.

(21) Appl. No.: 13/480,700

(22) Filed: May 25, 2012

(65) Prior Publication Data

US 2012/0233586 A1 Sep. 13, 2012

Related U.S. Application Data

(63) Continuation of application No. 12/170,113, filed on Jul. 9, 2008, now Pat. No. 8,271,935.

(51) Int. Cl.
*G06F 9/44* (2006.01)

(52) U.S. Cl.
USPC .......................... 717/104; 717/105; 717/162

(58) Field of Classification Search
None
See application file for complete search history.

(56) References Cited

U.S. PATENT DOCUMENTS

| | | | |
|---|---|---|---|
| 6,601,233 B1 | 7/2003 | Underwood | |
| 6,662,172 B1 | 12/2003 | Smith | |
| 7,047,518 B2 | 5/2006 | Little et al. | |
| 7,149,698 B2 | 12/2006 | Guheen et al. | |
| 7,577,934 B2 | 8/2009 | Anonsen et al. | |
| 7,730,446 B2 | 6/2010 | Anonsen et al. | |
| 7,735,062 B2 | 6/2010 | de Seabra e Melo et al. | |
| 7,870,535 B2 | 1/2011 | Rippert, Jr. et al. | |
| 8,478,615 B2 * | 7/2013 | Chen | 705/7.11 |
| 8,516,435 B2 * | 8/2013 | Akkiraju et al. | 717/104 |
| 2002/0120917 A1 | 8/2002 | Abrari et al. | |
| 2004/0003369 A1 * | 1/2004 | Gonos | 717/100 |
| 2004/0103405 A1 * | 5/2004 | Vargas | 717/137 |
| 2005/0022157 A1 | 1/2005 | Brendle et al. | |
| 2005/0120332 A1 * | 6/2005 | Martin et al. | 717/105 |
| 2006/0168555 A1 * | 7/2006 | Represas Ferrao et al. | 717/104 |
| 2007/0094199 A1 | 4/2007 | Deshpande et al. | |
| 2009/0006150 A1 | 1/2009 | Prigge et al. | |
| 2009/0007056 A1 | 1/2009 | Prigge et al. | |
| 2009/0037502 A1 | 2/2009 | Gupta et al. | |

OTHER PUBLICATIONS

Notice of Allowance for U.S. Appl. No. 12/170,113 dated May 15, 2012.
Bill Lewis; "Data-Oriented Application Engineering: An Idea Whose Time Has Returned"; http://www.tdan.com/view-articles/4582; Jan. 1, 2007; The Data Administration Newsletter; pp. 1-5.
Keri Anderson Healy, et al.; "Response to MDC/Microsoft Business Rules Metamodel by the Business Rules Group (BRG)"; Nov. 1999 working session; pp. 1-14.
"Metamodel Response Points"; www.businessrulesgroup.orglbrg-mdclbrg-mdcB.htm; pp. 1-7, 2008.

* cited by examiner

*Primary Examiner* — Don Wong
*Assistant Examiner* — Mohammad Kabir
(74) *Attorney, Agent, or Firm* — John Pivnichny; Roberts Mlotkowski Safran & Cole P.C.

(57) ABSTRACT

The invention generally relates to enterprise computer applications, and more particularly to methods and tools for data-driven engineering of computer applications. A method of generating a business application includes: inputting requirement data into a requirement model; inputting platform data into a platform model; generating a design model based on the requirement model and the platform model; generating source code of the business application from the design model; and outputting the source code.

17 Claims, 13 Drawing Sheets

METHODS AND TOOLS FOR DATA-DRIVEN APPLICATION ENGINEERING

CROSS REFERENCE TO RELATED APPLICATIONS

The present application is a continuation application of co-pending U.S. application Ser. No. 12/170,113, filed on Jul. 9, 2008, the contents of which are incorporated by reference in its entirety herein.

FIELD OF THE INVENTION

The invention generally relates to enterprise computer applications, and more particularly to methods and tools for data-driven engineering of computer applications.

BACKGROUND

Enterprise computer application development continues to be costly, labor intensive, high risk, and plagued with defects and qualified successes. These conditions are due in large part to endemic ambiguity and imprecision in (1) business requirements elicitation; (2) transforming business requirements into actionable specifications for data and software; (3) partitioning application software into manageable yet re-combinable executables; and (4) managing evolutionary change in both requirements specifications and technology platforms.

These problems are interrelated and mutually exacerbating. For example, ambiguity in business requirements results in a higher rate of change, which escalates the problems inherent in managing changes. A key contributing factor in these problems is the absence of methods and supporting tools for precisely, comprehensively and transparently defining the inevitable complex chains of interdependency that exist between data and software.

Known, attempted solutions include: model-driven development; automated code generation; agile and iterative development methods; business rules; the relational model of data; object-oriented methods; enterprise architecture; and service-oriented architecture. These disparate point solutions have achieved only partial success. However, methods and tools that synthesize their capabilities to enable full realization of their potential benefits are lacking, and no solution directly addresses the definition and management of data and software interdependencies.

While automated generation of executables from technology-neutral models of business requirements continues to be actively pursued as a way of alleviating problems with conventional systems, the widespread emphasis on graphical process models makes the required level of specificity persistently elusive.

Accordingly, there exists a need in the art to overcome the deficiencies and limitations described hereinabove.

SUMMARY

In a first aspect of the invention, there is a method of generating a business application comprising: inputting requirement data into a requirement model; inputting platform data into a platform model; generating a design model based on the requirement model and the platform model; generating source code of the business application from the design model; and outputting the source code.

In another aspect of the invention, there is a method of generating a business application comprising: defining a requirement model; defining a platform model; and instantiating the requirement model into a requirement metamodel. The method also includes: transforming the requirement model into a design model based upon the platform model; altering a portion of the design model to create a modified design model; generating a source code of the business application based on the modified design model; and outputting the source code.

In another aspect of the invention, there is a method of iteratively engineering a business application comprising providing a computer infrastructure that operates to: store input data associated with a requirement model and a platform model and transform the input data into a design model. The computer infrastructure further operates to: generate a first source code of the business application by transforming the design model; store revised input data based on altering the input data; transform the revised input data into a second design model; and generate a second source code of the business application by transforming the second design model.

In another aspect of the invention, there is a computer program product comprising a computer usable medium having a computer readable program embodied in the medium. The computer readable program, when executed on a computing device, causes the computing device to: instantiate a requirement model based on a requirement metamodel; based on a platform model, transform the requirement model into a design model; and generate source code of a business application from the design model. The requirement metamodel is implemented in a relational database and comprises entities and dependencies that define relationships between the entities, and the entities and dependencies define business rules of the business application.

In another aspect of the invention, there is a method of iteratively engineering a business application comprising providing a computer infrastructure that operates to: store input data associated with a requirement model and a platform model and transform the input data into a design model. The computer infrastructure further operates to: generate a first source code of the business application by transforming the design model; store revised input data based on altering the input data; transform the revised input data into a second design model; and generate a second source code of the business application by transforming the second design model.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to enterprise computer applications, and more particularly to methods and tools for data-driven engineering of computer applications. In embodiments, business requirements of a desired business application (e.g., software application) are defined as data and dependencies in a requirement model in a database. The requirement model is transformed into a design model based upon mapping rules and platform definitions. The design model is subsequently transformed into source code that is executable (e.g., compilable) on the target platform. In this manner, business applications that explicitly and precisely take into account and maintain data dependencies may be designed and generated.

Implementations of the invention provide a synthesis of multiple disparate disciplines and technologies, with an emphasis on data and data dependencies, realized as a method and supporting tools that enable data-driven engineering of enterprise computer applications. Embodiments of the invention enable practitioners to utilize selected best practices from multiple disciplines in a seamless, transparent and predictable manner, to rapidly develop adaptable, highly-maintainable enterprise applications closely aligned to business objectives. Moreover, aspects of the invention provide much greater precision and integrity in requirements specifications than conventional methods based primarily on graphical representations of business processes, leading to far fewer defects, and consequential rework, in resulting computer applications.

In implementations of the invention, an explicit representation of a design model of dependencies between data and logic allows for a high degree of automation, precision and predictability in generation of executables, as well as accuracy in assessing impacts of changes. Embodiments of the invention eliminate much of the guesswork and uncertainty surrounding the design of components and services. For example, in an automated or semi-automated fashion, support may be provided for partitioning of application software into cohesive yet loosely-coupled executables of optimal granularity, based on explicit and precise knowledge of data dependencies and dependencies between executables resulting from shared data usage. Aspects of the invention enable much greater traceability and transparency of data dependencies, relative to narrative code, and enable faster, easier and lower-defect development, enhancement, maintenance and testing of engineered applications.

Figure 1:
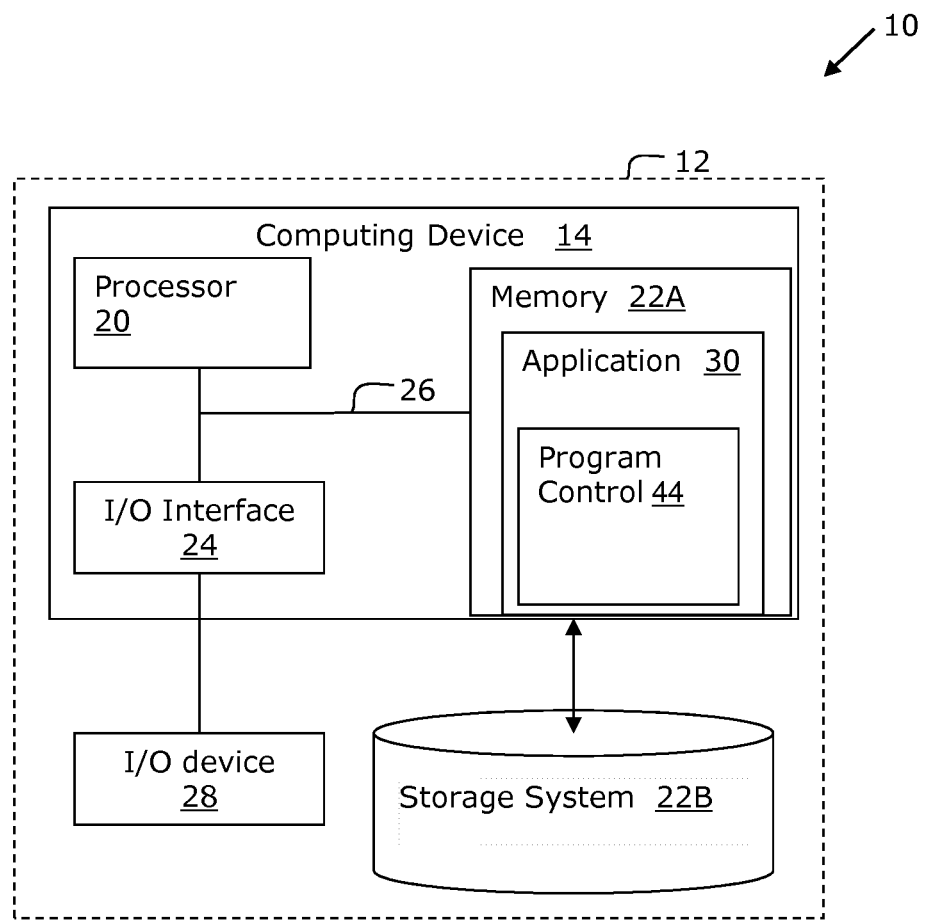
FIG. 1 shows an illustrative environment for implementing the steps in accordance with aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein. For example, the computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B.

The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device, and/or
- a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
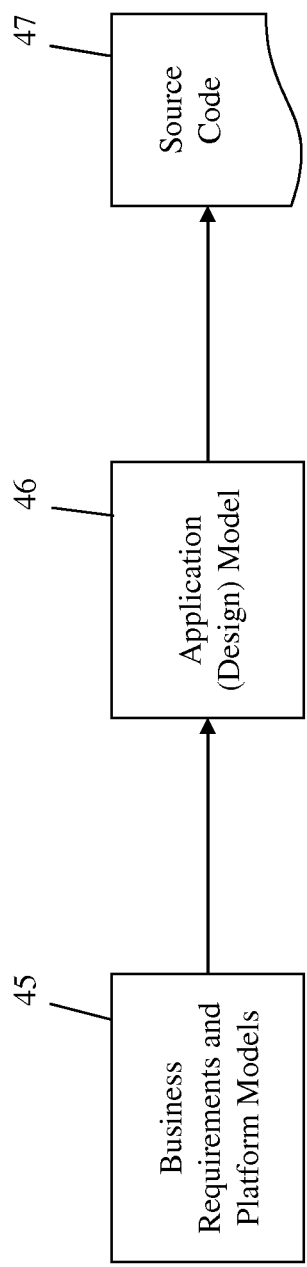
FIG. 2 shows a block diagram of aspects of the invention.

FIG. 2 shows a block diagram of aspects of the invention. In embodiments, business requirements and platform models 45 are transformed to an application (design) model 46, which is then transformed to source code 47. The business requirements and platform models 45 may include, for example, data arranged in a database. More specifically, the business requirements and platform models 45 may include data and dependencies between the data defined in a relational database, which data and dependencies specify (e.g., define, represent) predetermined business rules that are to be implemented by the business application. Moreover, the business requirements and platform data 45 may comprise data and dependencies between the data defined in the same or another relational database, which data and dependencies specify (e.g., define, represent) a platform on which the business application is to be run.

In embodiments, the application (design) data 46 also comprises data arranged in a database. More specifically, the application (design) data 46 includes, among other things, data and dependencies between the data defined in the same or another relational database, which data and dependencies are arranged as design units that can be converted to executable source code 47 for generating the business application. The source code 47 may be text, machine language, etc., that is executable on a platform to implement the desired business application.

Figure 3:
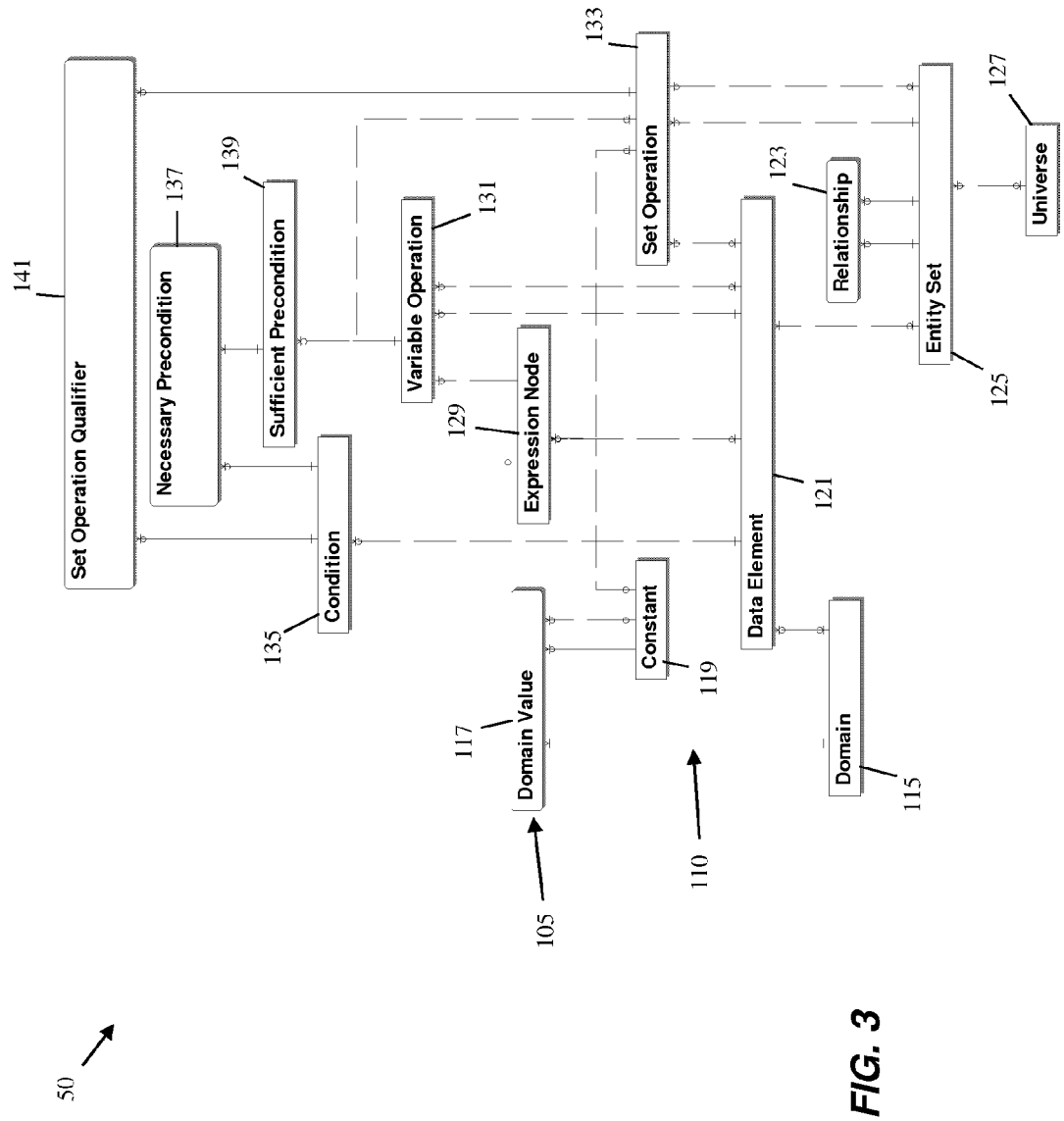
FIGS. 3-5 show exemplary data models according to aspects of the invention.

FIG. 3 shows an example of a requirements metamodel 50 in accordance with aspects of the invention. The requirements metamodel 50 is a pattern for a database and, in embodiments, is implemented as data in a relational database. For example, the requirements metamodel 50 may be included as part of the business requirements and platform data 45 described above in FIG. 2. In FIG. 3 each box (e.g., entity) 105 represents a table in a database and each line 110 represents a dependency defined in the database. The notation used in FIG. 3 (e.g., the use of boxes (e.g., entities) 105 and lines (e.g., dependencies) 110) is common in the art such that further explanation is not believed necessary.

The requirements metamodel 50 depicted in FIG. 3 includes the following data entities: domain 115, domain value 117, constant 119, data element 121, relationship 123, entity set 125, universe 127, and expression node 129. These data entities contain data that define values (e.g., constants, variables, attributes, names, definitions, etc.) that are utilized for implementing the business application.

The requirements metamodel 50 depicted in FIG. 3 also includes the following operation entities: variable operation 131 and set operation 133. These operation entities contain data that define aspects of business rules (e.g., formulas, operations, etc.) that are utilized for implementing the business application.

The requirements metamodel 50 depicted in FIG. 3 also includes the following condition entities: condition 135, necessary precondition 137, sufficient precondition 139, and set operation qualifier 141. These condition entities contain data that define conditions that must be satisfied for one of the operations entities to act on at least one of the data entities for implementing the business application.

The data that defines the various entities (e.g., 105) and the dependencies (e.g., 110) and the data contained in the entities, may be entered (e.g., input, provided, etc.) to the database in any suitable fashion. For example, the data may be manually entered by a user utilizing a computer interface that accesses the database, described in greater detail herein.

Thus, the requirements metamodel 50 of FIG. 3 specifies predetermined business requirements of the desired business application in terms of data descriptions, data logistics, data operations, conditions, and dependencies. Put another way, the predetermined business requirements of the desired business application are defined as data and dependencies between the data in the requirements metamodel 50. Moreover, although a particular exemplary requirements metamodel 50 is shown, the invention is not limited to this exemplary embodiment. Instead, the requirements metamodel 50 of the present invention may take different forms depending on the predetermined business requirements of the desired business application. For example, the requirements metamodel 50 may contain more, less, or different types of entities 105. Additionally or alternatively, the requirements metamodel 50 may contain different numbers and/or types of dependencies 110 between the various entities 105.

Figure 4:
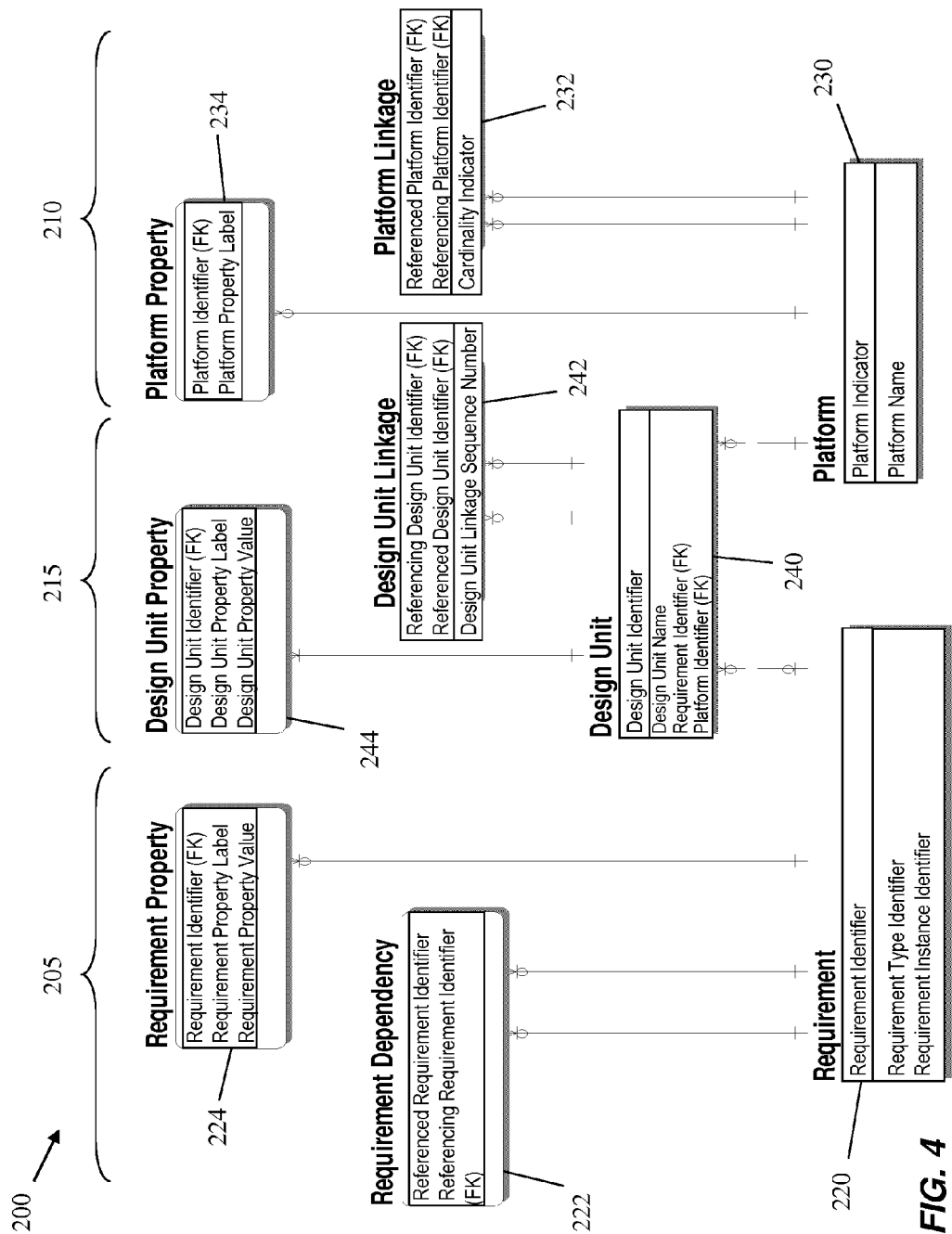

FIG. 4 shows a design metamodel 200 according to aspects of the invention. According to aspects of the invention, requirements analysis is targeted to the precise modeling of business data, while application design is targeted to packaging data, along with its dependencies and dependents, in ways that fulfill business requirements while maintaining the integrities of the dependencies among the requirements objects. Accordingly, in embodiments, the design metamodel 200 supports transformation of business requirements (e.g., specified as data in the requirements metamodel 50) into packaged and compilable application code (e.g., source code 47), while enforcing and maintaining all of the dependencies 110 defined in the requirements metamodel 50. Generally speaking, the requirements metamodel 50 is a business oriented definition of the business requirements that are to be implemented by the business application. On the other hand, the design metamodel 200 defines the implementation of those requirements in a computing platform. In embodiments, the design metamodel 200 is arranged as a database model which may be implemented in the same or a different relational database as the requirements metamodel 50.

In embodiments, the design metamodel 200 includes a requirements metamodel 205, and platform metamodel 210, and a design unit metamodel 215. Each of the models 205, 210, 215 further includes a base entity, dependency entity, and property entity. For example, the requirements metamodel 205 includes a requirements base entity 220, requirements dependency entity 222, and requirements property entity 224.

The requirements metamodel 205 represents an intermediate transformation of the requirements metamodel 50. According to aspects of the invention, one of the processes involved in transforming the business requirements and platform data 45 into the application (design) model 46 (e.g., FIG. 2) is to instantiate all of the instances of the requirements metamodel 50 (e.g., FIG. 3) into the requirements metamodel 205 shown in FIG. 4. For example, in the requirements metamodel 50, each of the boxes 105 represents a database table having rows within the table. In embodiments, the requirements base entity 220 includes a row that corresponds to each respective row of every box 105 of the requirements metamodel 50. As such, the data contained in all of the rows of all of the boxes 105 of requirements metamodel 50 is contained in the respective rows of requirements base entity 220.

The requirements dependency entity 222 contains data corresponding to each of the dependency lines 110 of the requirements metamodel 50. These data define what and how the requirements in the requirements base entity 220 relate to each other, such as, for example, what conditions are used as necessary preconditions, what data elements are used by a variable operation, etc.

The requirements property entity 224 contains data that specifies the properties (e.g., characteristics, attributes, etc.) of each of the objects (e.g., rows) in the requirements base entity 220. Each object in the requirements base entity 220 may have one, zero, or many properties (e.g., name, data type, operation operator, etc.). Thus, the requirements metamodel 205 represents an intermediate transformation of the requirements metamodel 50, in which all of the information of the numerous boxes 105 and dependencies 110 of the requirements metamodel 50 are summarized into the requirements base entity 220, requirements dependency entity 222, and requirements property entity 224.

Still referring to FIG. 4, the platform metamodel 210 includes a platform base entity 230, platform dependency entity 232 (e.g., platform linkage), and platform property entity 234. The platform base entity 230 contains data that defines a computer implementation technology that the business application will execute on. A given platform is an implementation environment with specific configuration values such as IP address, server name, instance name, syntax, etc. The platform base entity 230 may contain data pertaining to plural different platforms, thereby providing a list of potential implementation platforms. The platform dependency entity 232 contains data that specifies dependencies between the data of the platform base entity 230 particular to the platform(s) to be implemented. The platform dependencies become design unit dependencies (discussed below) when requirements are transformed into design units.

Furthermore, the platform property entity 234 contains data that specifies the properties (e.g., characteristics, attributes, etc.) of each of the objects (e.g., rows) in the platform base entity 230. Generally speaking, a platform property is a characteristic of an implementation platform that may be assigned a specific value. Accordingly, each object in the platform base entity 230 may have one, zero, or many properties defined in the platform property entity 234. Thus, in embodiments, the platform metamodel 210 comprises data that specifies the platform(s) that the business application will be executed on.

Still referring to FIG. 4, the design unit model 215 represents the result of the transformation of the requirements metamodel 205 based on the platform model 210. The design unit model 215 includes a design unit base entity 240, design unit dependency entity 242 (also referred to as a design unit linkage entity), and design unit property entity 244. The design unit base entity 240 is a set of one or more objects from the requirements base entity 220 targeted for a specific platform as defined by the platform base entity 230. Accordingly, each design unit object relates to one requirement object and one platform object. Put another way, a design unit object is the result of a transformation of a business requirement (defined in the requirements model 205) into a specific platform (defined by the platform model 210). In embodiments, lines of the design unit base entity 240 are structured rows derived from the requirements metamodel 205 that provide all of the details required for generation of compilable code by syntax formatters.

In embodiments, the design unit dependency entity 242 contains data that defines relationships between objects of the design unit base entity 240. For example, design unit dependency entity 242 contains data that specifies that if design unit "B" is referenced by (e.g., used by or included in) design unit "A," then design unit "A" must accommodate for all input and output dependencies of design unit "B." That is, design unit "A" dependencies include all of design unit "B" dependencies. In embodiments, the nodes of an inverted tree comprising a design unit have corresponding requirements objects, which also have dependencies.

The design unit property entity 244 contains data that specifies the properties (e.g., characteristics, attributes, etc.) of each of the objects in the design unit base entity 240. Each object in the design unit base entity 240 may have one, zero, or many properties (e.g., name, data type, null option, etc.). Thus, the design unit model 215 contains data that facilitates the transformation of business requirements into compilable application code.

Figure 5:
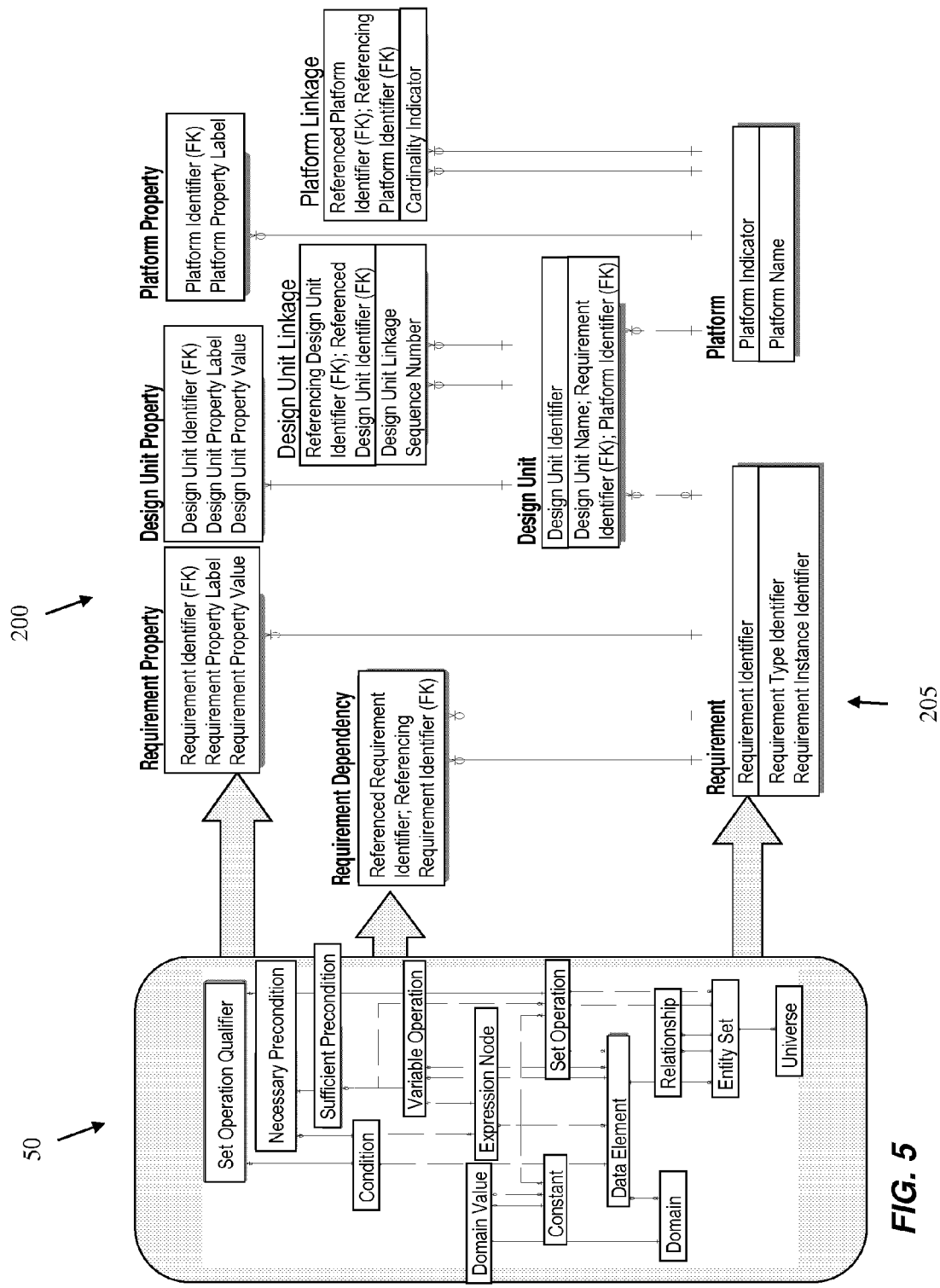

FIG. 5 depicts the relationship between the requirements metamodel 50 and the design metamodel 200. As described with respect to FIGS. 3 and 4, the requirements metamodel 205 is an instantiation of all of the data and dependencies specified in the requirements metamodel 50.

Figure 6:
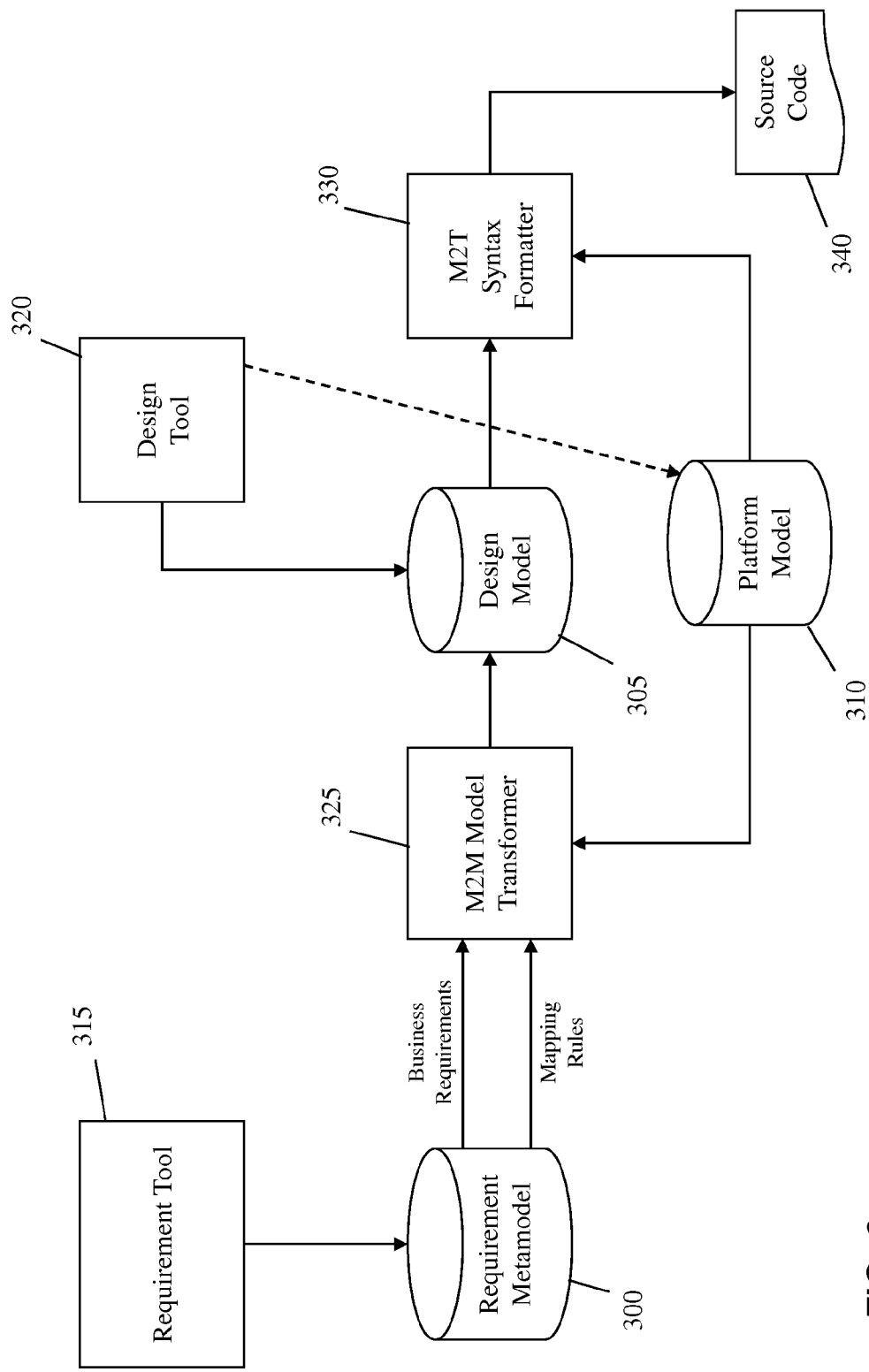
FIG. 6 shows a system according to aspects of the invention.

FIG. 6 shows a diagrammatic representation of a system for performing processes according to aspects of the invention. In embodiments, the system comprises a requirements metamodel 300, which may be the requirements metamodel 50 described above with respect to FIG. 3. Moreover, the system comprises a design metamodel 305, which may comprise the design metamodel 200 described above with respect to FIG. 4. Furthermore, the system includes a platform model 310, which may be similar to the platform model 210 portion of the design metamodel 200 described above with respect to FIG. 4.

In embodiments, the system comprises a requirements tool 315 that facilitates input and updating of the data contained in the requirements metamodel 300. For example, the requirements tool 315 may comprise a software application (e.g., 30 shown in FIG. 1) that provides a user front-end for entering data into the database in which the requirements metamodel 300 is implemented.

According to aspects of the invention, the system also comprises a design tool 320 that facilitates input and updating of the data contained in the platform model 210. The design tool 320 may be similar to the requirements tool 315 in that it may comprise a software application (e.g., 30 shown in FIG. 1) that provides a user front-end for entering data into the database in which the platform model 210 is arranged. The design tool 320 may be comprised in a same, or a different, software application (e.g., 30 shown in FIG. 1) as the requirement tool 315. According to further aspects of the invention, described in greater detail below, the design tool 320 provides a user with the ability to manually modify the design model 305 after an initial design model is generated by the system.

Still referring to FIG. 6, the system includes a model-to-model (M2M) transformer 325 that, in embodiments, comprises a series of programs that read the requirements model 300 (including mapping rules) and the platform model 310, and creates the design model 305. In embodiments, the mapping rules are rules that define the transformation of requirements objects into design unit objects. For example, a mapping rule might require that every entity be made into a table. In embodiments the mapping rules are manually entered using the requirements tool 315 as part of the requirements metamodel 300. In this manner, first cut design units are automatically derived by the M2M model transformer 325 based on the requirements metamodel 300, including the mapping rules, and a given platform model 310 that specifies the environment in which the data will be stored, created, retrieved, updated, and deleted.

In embodiments, after the design model 305 is automatically created using the M2M model transformer 325, the design tool 320 may optionally be used to manually modify the design model 305, as described in greater detail below. The design model 305, after automatic creation by the M2M model transformer 325 and any optional manual modification, is transformed by the model-to-text (M2T) syntax formatter 330 into source code 340.

According to aspects of the invention, the source code 340 comprises source code listings (e.g., text, code, etc.) that can be input into a compiler, database management system (DBMS), etc., and executed to create the business application. For example, the code listing may be a report created for the consumption of both humans and computers. A conventional M2T syntax formatter 330 can be used to reformat the design units and design unit properties and linkages of the design model 305 into compilable listings including database DDL, programming code, XML documents, JSP's, HTML pages, and whatever other scripts may be required. Examples of commonly available syntax formatters include XSLT, regular expressions, vendor offerings such as TextPipe, and common reporting tolls such as Microsoft Access. Moreover, language specific syntax elements with no business significance may be coded directly into the M2T syntax formatter 330.

While application design is concerned primarily with packaging data and enabling software, software development is concerned primarily with creating machine-compilable documents that are syntactically correct for a given execution platform. When application design is performed as described herein, development becomes primarily a matter of appropriate syntax formatting. The precise structure and content of the design metamodel makes downstream model-to-text transformation straightforward and predictable.

Figure 7:
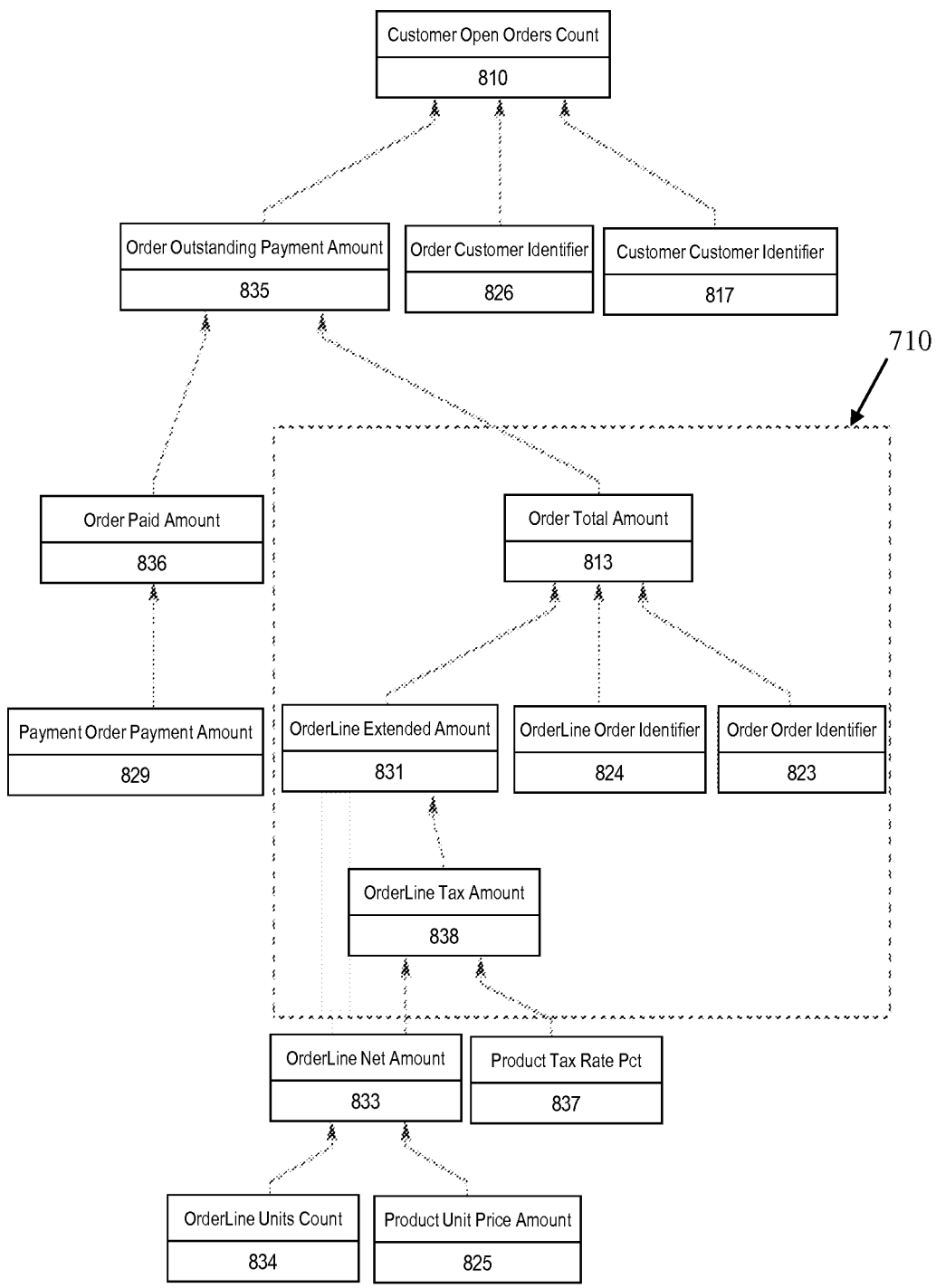
FIGS. 7-11 show exemplary screen shots of a tool according to aspects of the invention.
Figure 8:
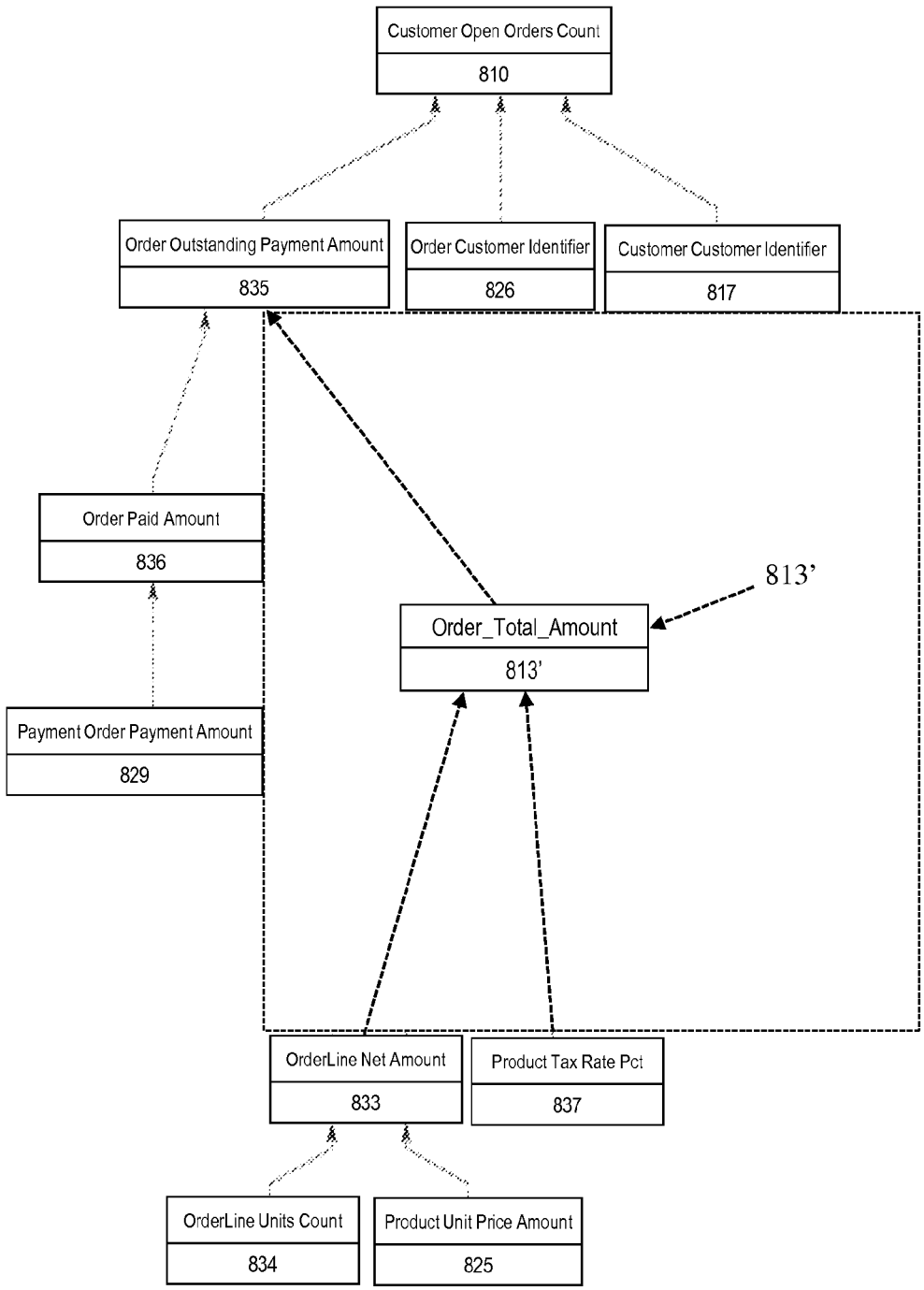

As described herein with respect to FIG. 6, in embodiments, the design tool 320 allows a user to manually change aspects of the design metamodel 305 after the design metamodel 305 is created using the M2M model transformer 325. FIGS. 7 and 8 show an example of a change made using the design tool. More specifically, FIG. 7 shows an exemplary dependency graph presented to a user by the design tool. The rectangles are candidate design units as created by the M2M model transformer, and the lines show dependencies between them. This presentation allows the architect (e.g., user) to visualize possible bottom-up packaging and top-down partitioning of design units, while being continually aware of consequences of re-routing of dependencies. Resolution of dependencies is enforced by the tool and can be done automatically by the tool and/or manually by the architect.

For example, the architect may want to assess the impact of packaging a set of design units as a web service. Accordingly, as depicted in FIG. 7, the architect selects a group of design units using a selection tool 710. As seen in FIG. 8, the design tool combines the group of selected design units into a single design unit 813'.

Figure 9:
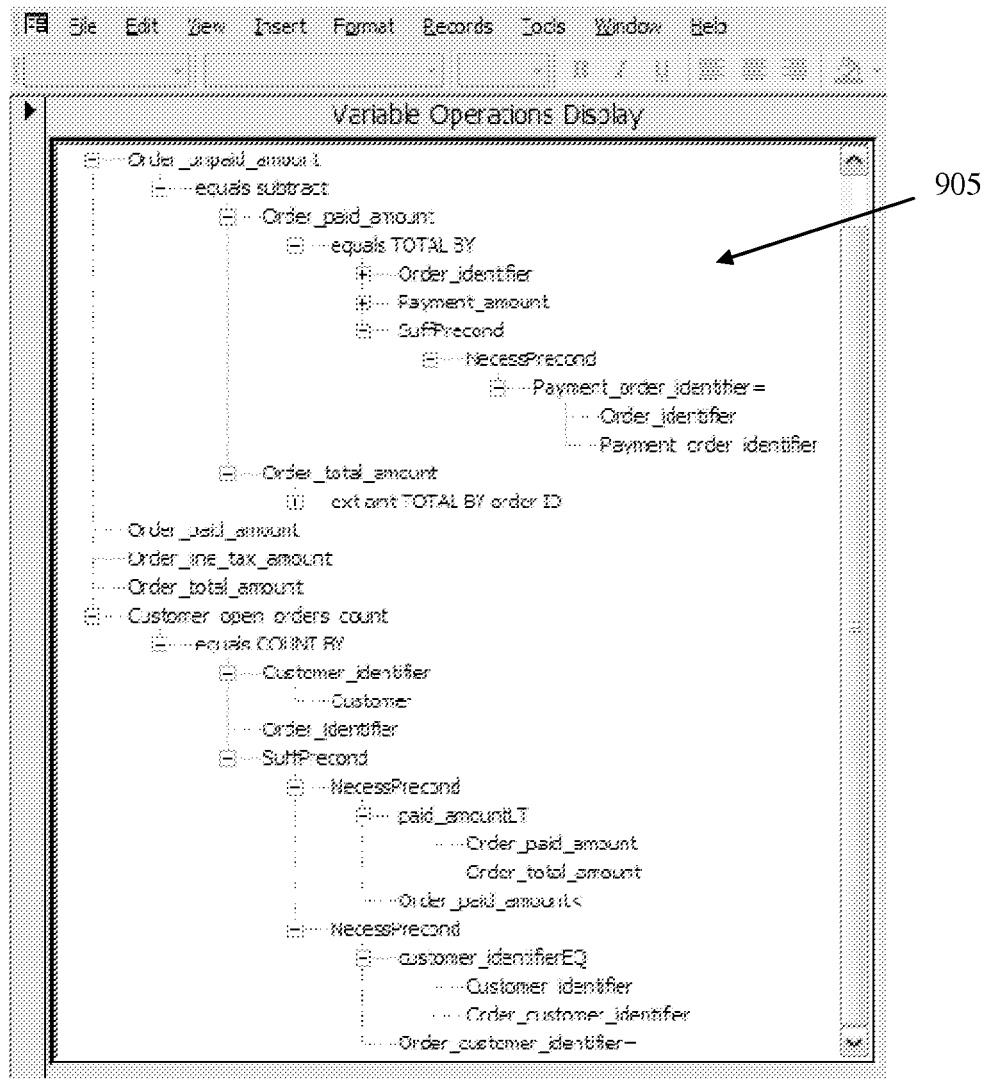
Figure 10:
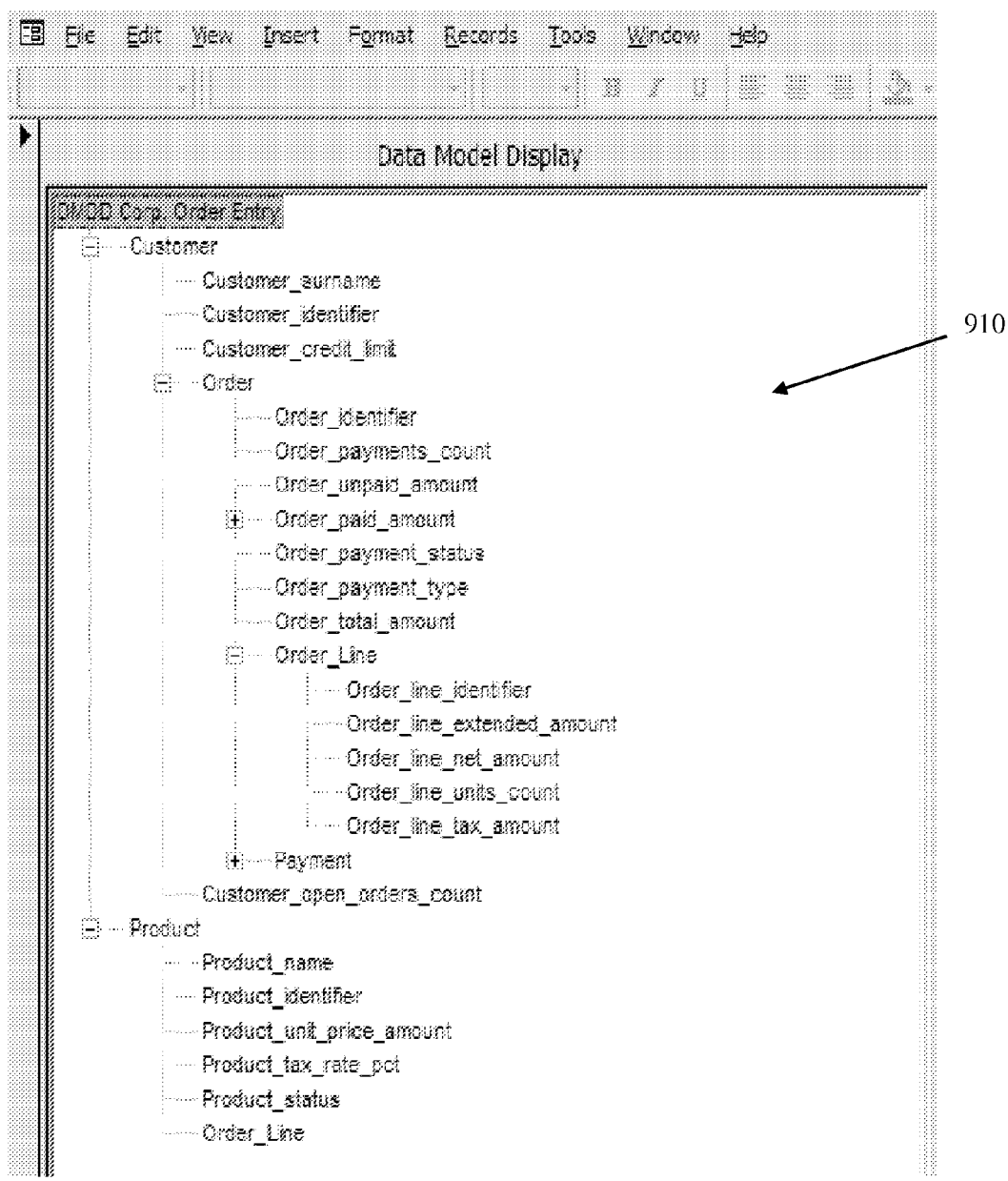
Figure 11:
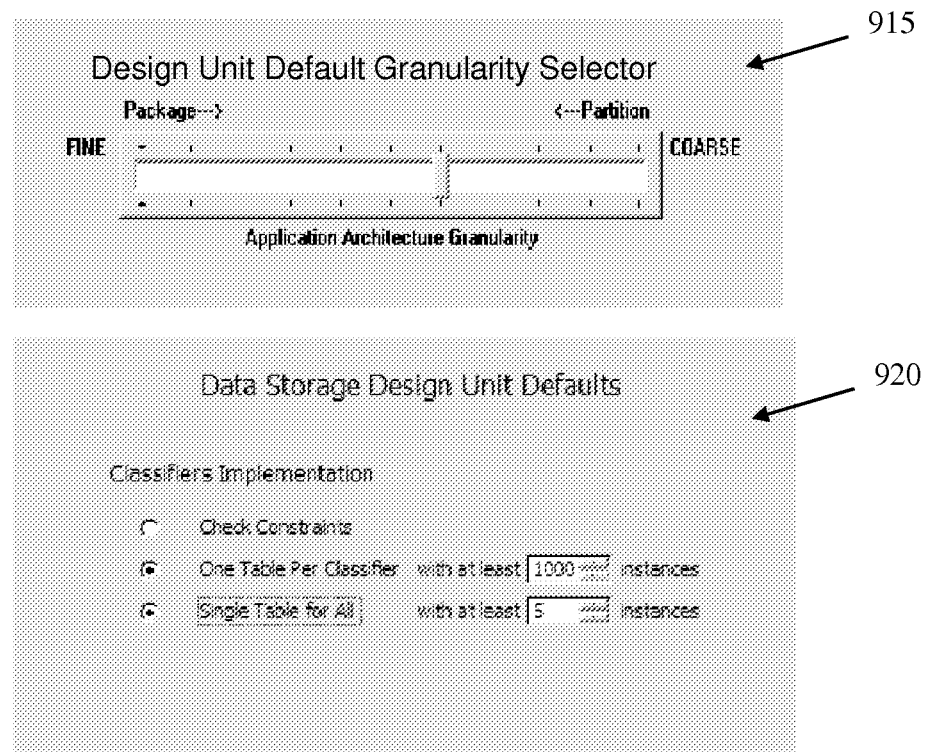

FIGS. 9-11 depict exemplary screen shots of a user interface of a design tool in accordance with aspects of the invention. For example, FIG. 9 shows a nested listing 905 of aspects of variable operations. FIG. 10 shows a nested listing 910 of aspects of a data model. FIG. 11 shows a design unit default granularity selector 915, which provides a sliding scale of application architecture granularity between fine and coarse. FIG. 11 also shows a data storage design unit defaults user interface 920, which includes user-selectable fields for checking constraints, tables per classifier, and a single table for all.

In embodiments, the design tool 320 makes these dependencies visually explicit, allowing for informed yet flexible decision making by architects. Design units provide for multiple, nested levels of granularity, and may be flexibly packaged while still accounting for dependencies. Design units representing pre-deployed assets can be created by manual or automated reverse engineering. Moreover, in further embodiments, dependencies of reverse-engineered design units may be captured and enforced.

According to further aspects of the invention, packaging and partitioning parameters and defaults (such as, for example, maximum nesting levels, maximum number of executables, and maximum intermediate data stores) can be configured using the design tool 320. For example, platform specifications may be added, removed and changed; pre-existing reversed/reused artifacts may be added and removed; dependency-resolution types such as synchronous/asynchronous, vertical/horizontal may be prototyped, and location and number of intermediate data stores may be configured.

Figure 12:
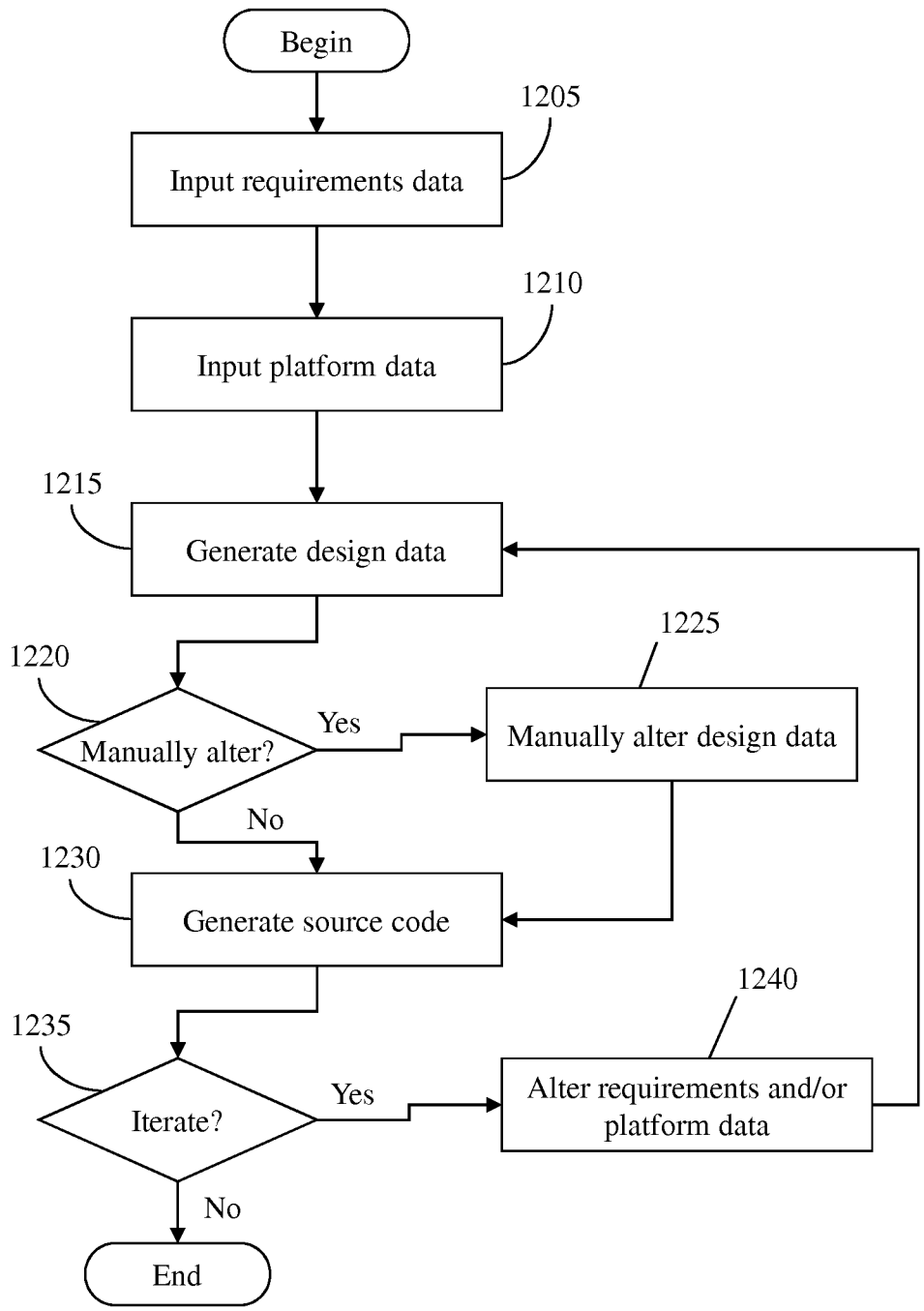
FIG. 12 shows a flow diagram depicting implementations of methods according to aspects of the invention.

FIG. 12 shows a flow diagram implementing aspects of the invention. The steps of the flow diagram described herein may be implemented in the environments of FIGS. 1, 2, and 6. The flow diagram may equally represent a high-level block diagram of the invention. The steps of the flow diagram may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1, 2, and 6. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

FIG. 12 shows a flow diagram depicting steps of a first method for designing and generating a business application according to aspects of the invention. At step 1205, a user inputs requirements data. In embodiments, a user utilizes a requirements tool (such as that described above with respect to FIG. 6) to enter data that defines a requirements model. The requirements data may include mapping rules, as described above. At step 1210, a user utilizes a design tool to input data that defines a platform model, as described above with respect to FIG. 6.

At step 1215, design data is generated by a transformer, such as, for example, the M2M model transformer as described above with respect to FIG. 6. The design data is embodied in the design model. At step, 1220, a decision is made whether to perform an optional manual alteration of the design data. For example, should a user desire to change the number of design units generated in step 1215, then the user may utilize the design tool at step 1225 to group, ungroup, add, delete, reformat, etc., design units, as described above with respect to FIGS. 7-11. After manual changing of the design data at step 1225, or if the answer to the decision at step 1220 is "no," then at step 1230 the source code is generated by a transformer, e.g., M2T syntax formatter described above with respect to FIG. 6. This results in a source code listing for the business application that can be compiled on a target platform. Accordingly, with the compilation of the source code listing, users may begin utilizing the business application.

Steps 1235 and 1240 show optional steps of iterating the design of the business application. Implementations of the invention allow prototype application versions to be quickly generated from and initially deployed to simple technology platforms, enabling validation of requirements specifications and iterative elicitation of more detailed requirements. Accordingly, at step 1235, a user decides whether or not to iterate with the design of the application. If the answer is "no," then the process ends. If the answer is "yes," then at step 1240 the requirements data and/or the platform data is altered from what was originally defined in steps 1205 and 1210. The alterations may be based on, for example, feedback received from users utilizing the business application created from the source code from step 1230.

After altering at least one of the requirements and platform data, the process returns to step 1215 where new design data is generated using the updated requirements data and platform data. In this manner, beta-testing can be performed before a final version of the business application is released. Moreover, the iterative generation and testing may be performed in a first platform, while the source code for the final version of the business application is generated for a second, different platform.

Figure 13:
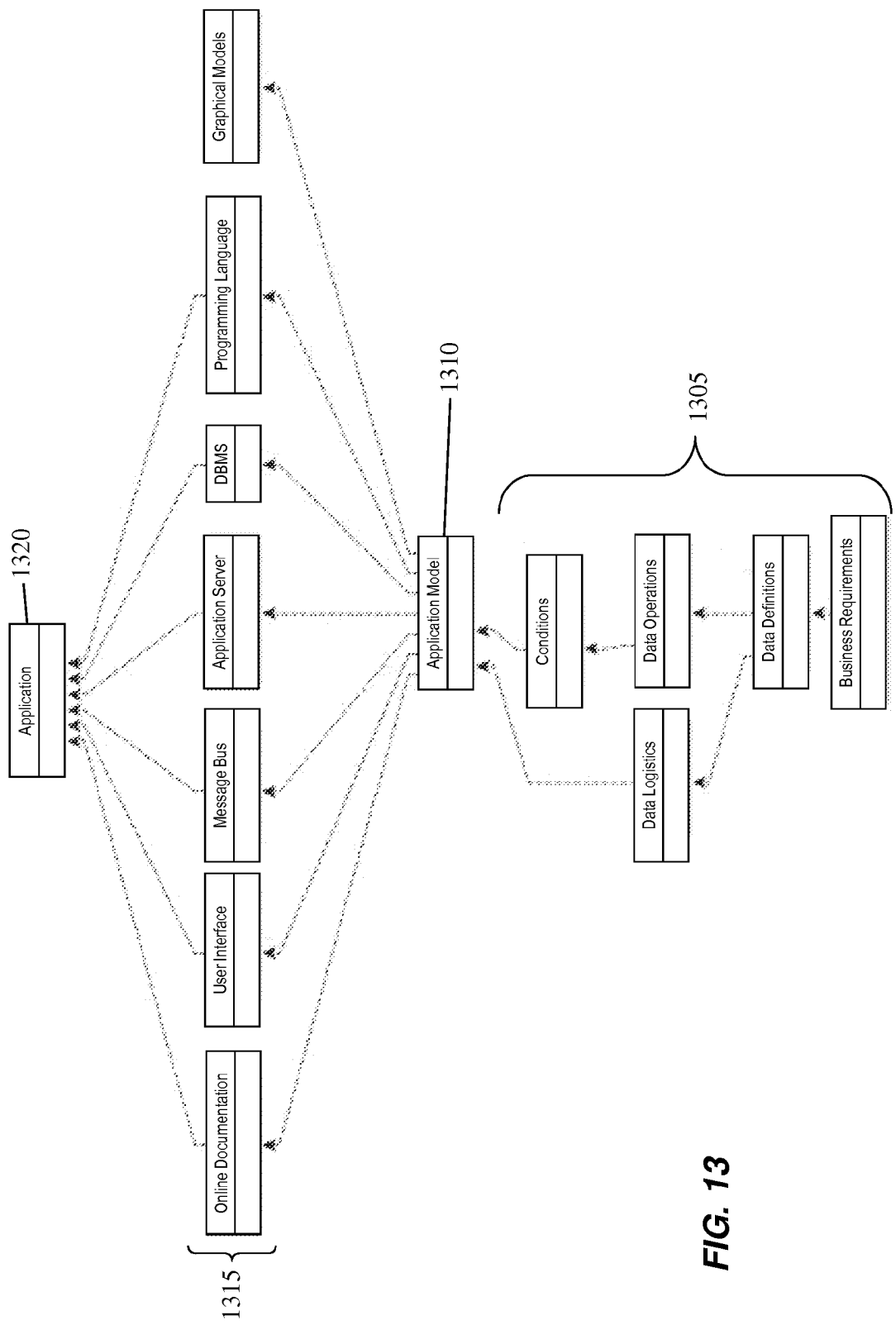
FIG. 13 shows a top level overview of elements and dependencies according to aspects of the invention.

FIG. 13 shows a top level overview of elements and dependencies according to aspects of the invention. The elements 1305 represent data defined in the requirements metamodel. The application model 1310 represents the design metamodel. The elements 1315 represent exemplary functionality desired in the business application 1320. Data specifications can be generated into database and/or message definitions targeted to products. Data logistical (input/output) functions can be generated into SQL statements, and, by interfacing with other tools, into user interface definitions where required. Operation and condition specifications can be generated, for example, into database views, triggers and/or stored procedures.

Applications generated from toolsets such as that shown in FIG. 13 can be scaled up to enterprise-wide, multi-platform implementations by positioning the requirements model as a canonical model, and migrating the initial single-platform data logistics to a rules-based routing capability. A canonical model and router can be implemented using the capabilities of available application server software.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of generating a business application, the method comprising:
   defining a requirement model;
   defining a platform model, the requirement model and the platform model comprising data and dependencies between the data, defined in a relational database;
   instantiating the requirement model into a requirement metamodel;
   transforming the requirement model into a design model based upon the platform model, the design model comprising a design unit linkage entity which instantiates each dependency of the design model and a plurality of design units;
   altering a portion of the design model to create a modified design model, the altering comprising converting a subset of the plurality of design units into a single design unit;
   generating a source code of the business application based on the modified design model;
   outputting the source code.

2. The method of claim 1, wherein the requirement metamodel is implemented in a database and comprises entities and dependencies that define relationships between the entities.

3. The method of claim 1, wherein the plurality of design units are defined in the database.

4. The method of claim 1, wherein the altering comprises manually selecting the subset of the plurality of design units.

5. The method of claim 1, further comprising providing a computer infrastructure arranged to perform at least one of the instantiating, the transforming, and the generating.

6. The method of claim 1, wherein the requirement metamodel comprises data entities, operation entities, and condition entities.

7. The method of claim 6, wherein:
   the data entities include at least one of a domain, a domain value, a constant, a data element, a relationship, an entity, an universe, and an expression node;
   the operation entities include at least one of a variable operation and a set operation; and
   the condition entities include at least one of a condition, a necessary precondition, a sufficient precondition, and a set operation qualifier.

8. The method of claim 7, wherein:
   the data entities include data which define values utilized for implementing the business application;
   the operation entities include data which define aspects of business rules for implementing the business application; and
   the condition entities include data which define conditions that that must be satisfied for one of the operation entities to act on at least one of the data entities.

9. A method of iteratively engineering a business application, comprising:
   providing a computer infrastructure that operates to:
   store input data associated with a requirement model and a platform model, the input data comprising data and dependencies between the data, defined in a relational database;
   transform the input data into a design model;
   generate a first source code of the business application by transforming the design model;
   store revised input data based on altering the input data;
   transform the revised input data into a second design model; and
   generate a second source code of the business application by transforming the second design model, wherein:
   the first source code is executable on a first platform, and
   the second source code is executable on a second platform different from the first platform.

10. The method of claim 9, wherein the requirement model is an instantiation of a requirement metamodel which is implemented in a relational database and comprises entities and dependencies that define relationships between the entities.

11. The method of claim 9, wherein the altering the input data is based upon feedback from at least one user executing the first source code.

12. A computer program product comprising a computer memory having a computer readable program embodied in the memory, wherein the computer readable program when executed on a computing device is operable to cause the computing device to:
   instantiate a requirement model based on a requirement metamodel;
   based on a platform model, transform the requirement model into a design model; and
   generate source code of a business application from the design model,
   wherein the requirement metamodel is implemented in a relational database and comprises entities and dependencies that define relationships between the entities, and
   the entities and dependencies define business rules of the business application.

13. The computer program product of claim 12, wherein the transforming is accomplished using predefined database queries.

14. The computer program product of claim 12, wherein the platform model is based on a platform metamodel having a platform base entity, a platform dependency entity, and a platform property entity.

15. The computer program product of claim 14, wherein:
   the platform base entity includes data that defines a computer implementation technology that the business application will execute on, and includes data pertaining to a plurality of platforms and providing a list of potential implementation platforms;
   the platform dependency entity contains data that specifies dependencies between the data of the platform base entity particular to one or more platforms to be implemented; and
   the platform property entity includes data which specifies properties of the data of the platform base entity.

16. The computer program product of claim 12, wherein the design model comprises a plurality of design units and the computer readable program is further operable to cause the computing device to alter a portion of the design model to create a modified design model, the altering comprising converting a subset of the plurality of design units into a single design unit.

17. The computer program product of claim 16, wherein the computer readable program is further operable to:
   generate a second source code based on the modified design model; and
   output the second source code, wherein:
   the source code is executable on a first platform, and
   the second source code is executable on a second platform different from the first platform.

* * * * *